Figure 1:
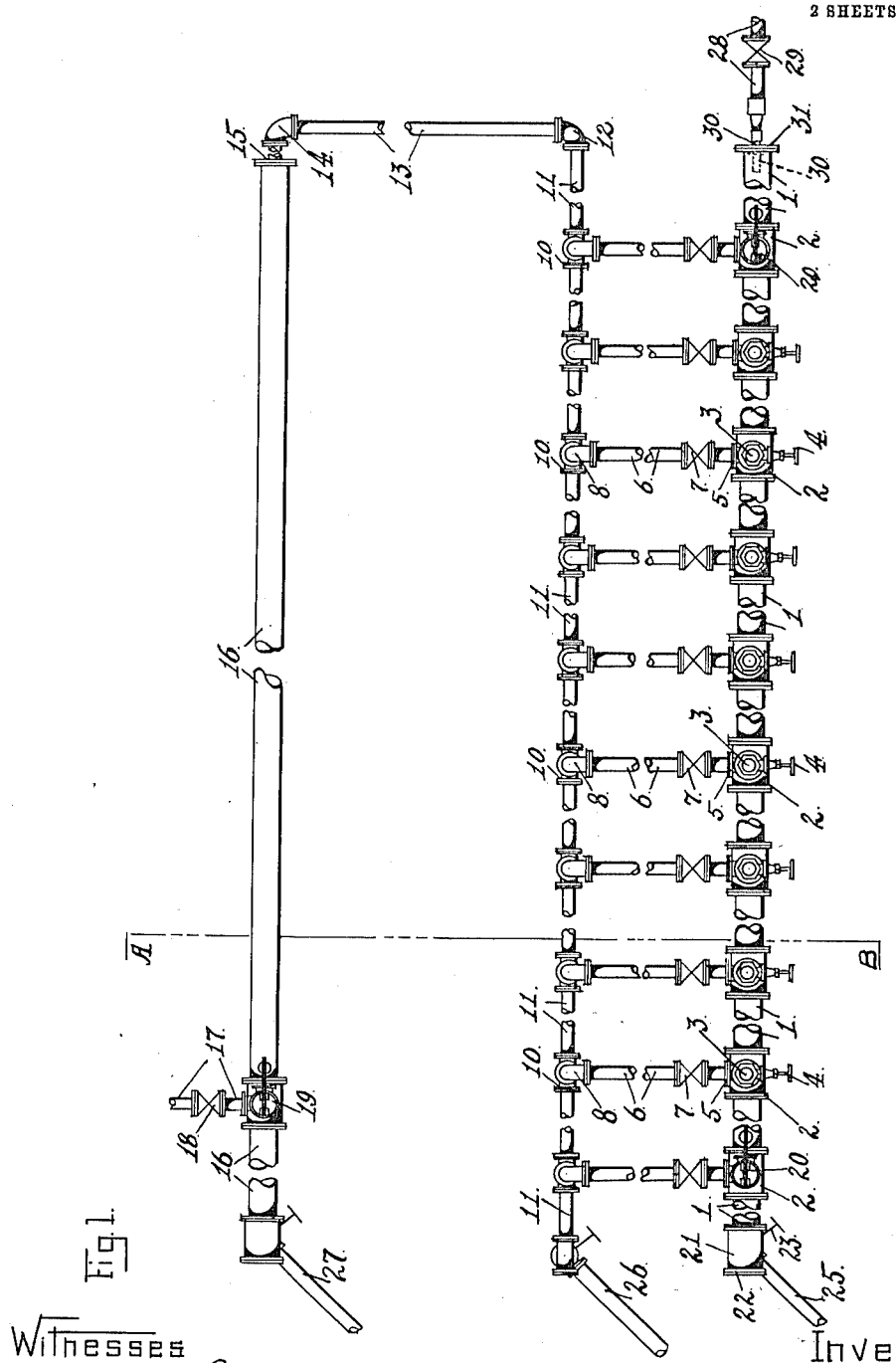

E. A. STARKE.
APPARATUS FOR SAVING GAS AND OIL FROM PRODUCING WELLS.
APPLICATION FILED JAN. 31, 1912.

1,040,806.

Patented Oct. 8, 1912.

2 SHEETS—SHEET 1.

Witnesses
Arthur L. Slee.
S. Constine

Inventor
Eric A. Starke
by Wm. F. Booth
his Attorney.

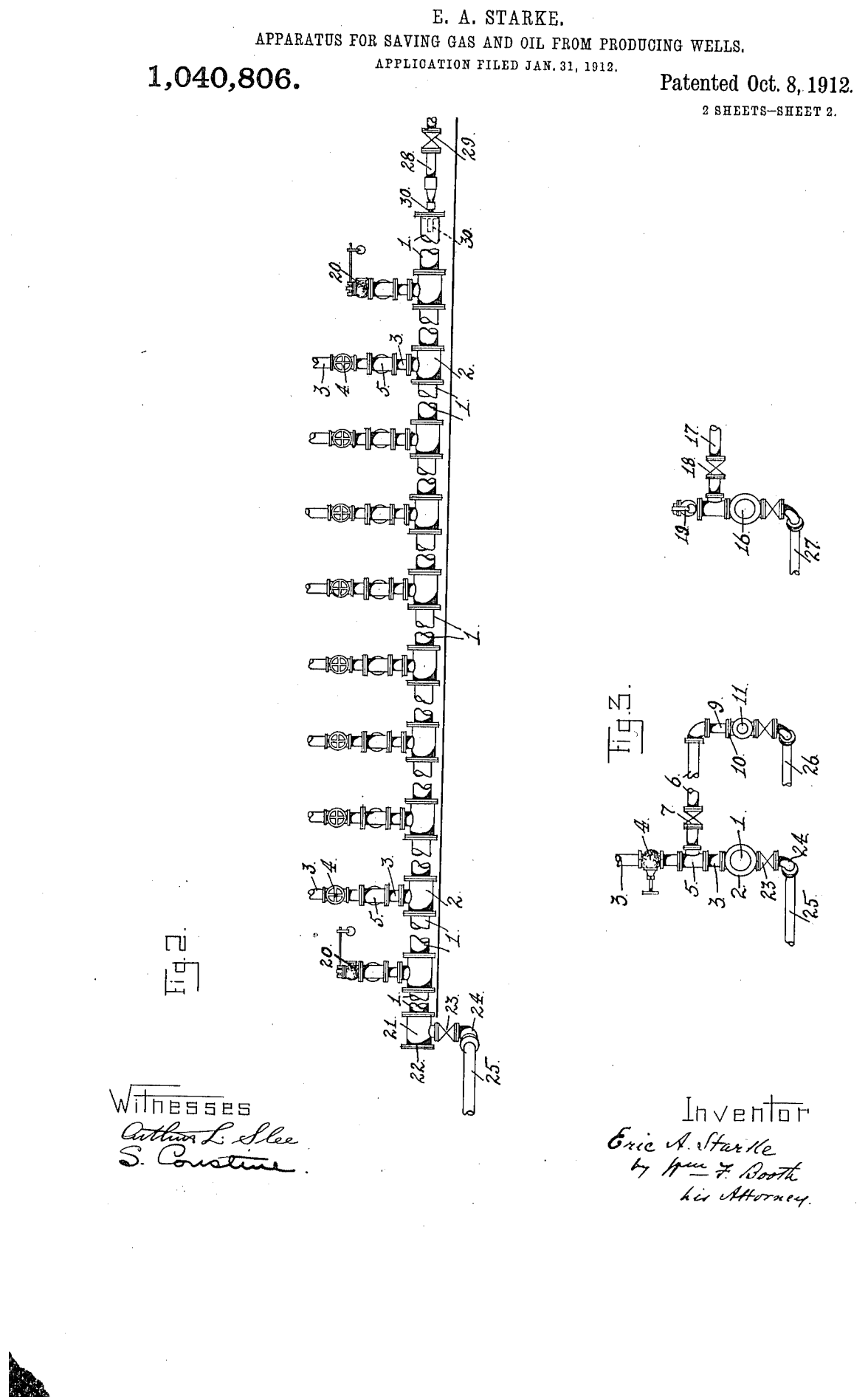

E. A. STARKE.
APPARATUS FOR SAVING GAS AND OIL FROM PRODUCING WELLS.
APPLICATION FILED JAN. 31, 1912.

1,040,806.

Patented Oct. 8, 1912.

2 SHEETS—SHEET 2.

UNITED STATES PATENT OFFICE.

ERIC A. STARKE, OF BERKELEY, CALIFORNIA.

APPARATUS FOR SAVING GAS AND OIL FROM PRODUCING-WELLS.

1,040,806.  Specification of Letters Patent.  Patented Oct. 8, 1912.

Application filed January 31, 1912. Serial No. 674,453.

*To all whom it may concern:*

Be it known that I, ERIC A. STARKE, a citizen of the United States, residing at Berkeley, in the county of Alameda and State of California, have invented certain new and useful Improvements in Apparatus for Saving Gas and Oil from Producing-Wells, of which the following is a specification.

My invention relates to apparatus in connection with the production of oil and its associated gas.

It frequently happens that petroleum and gas occur in the same well; that is, they are simultaneously produced. Owing to the high pressure under which the gas exists with the petroleum, (from 30 to 1200 pounds per square inch) it cannot be readily controlled, and it has, heretofore, in general practice at least, been permitted to blow into the open atmosphere or into an earthen receptacle. When this is the case, the gas goes to waste, and also occasions further and serious loss in that it carries away with it a valuable percentage of the lighter hydrocarbons, gasolene especially. There is therefore a double loss, and this is the more to be taken note of, when it is remembered that wells of this description frequently produce daily from one million to five million cubic feet of gas, and from one thousand to three thousand barrels of light oil.

The object of my invention is to provide an apparatus by the use of which the gas can be separated and removed from the oil under conditions which will not only permit said gas to be used in mains for commercial purposes, but which will also compel the gas to leave behind in the oil, the lighter hydrocarbons which it would otherwise carry away. Thus both gas and oil are saved.

What I have said above applies, in so far as the saving of the gas is concerned, to those wells in which the gas is held in solution under pressure in water. My invention is, therefore, applicable to such wells, that is, the wells which produce gas and water, and I am to be understood herein to cover the apparatus when used in such connection; though, for the sake of simplicity I shall herein describe the invention in terms of oil and gas producing wells.

My invention consists in the novel apparatus which I shall now fully describe by reference to the accompanying drawings, in which—

Figure 1 is a plan, broken, of my apparatus. Fig. 2 is an elevation of the same. Fig. 3 is a section on line A—B of Fig. 1.

In describing my invention, I will for clearness take as a sample the construction and general dimensions of an apparatus now in successful use, though I do not, of course, confine myself to these particulars.

1 is a 10 inch pipe, 360 feet long, laid in a recumbent position, either horizontally or approximately so, say with a fall of ten feet, as is indicated in Fig. 2, by its relation to the line below which may be taken for the horizontal. Into this pipe at equidistant intervals are let the 10x10x4 inch T's 2, ten in number. These T's have fitted to them the 4 inch stand pipes 3, the upper ends of which open to the atmosphere and are controlled by needle valves 4.

Into each of the stand pipes 3 is let a 4 inch T 5, to each of which is fitted a four inch horizontal pipe 6, with a gate 7. The other ends of these pipes 6 are fitted with 4 inch elbows 8, to which are fitted the 4 inch down pipes 9, which by T's 10 join a 4 inch pipe 11, parallel with and having a length equal to the pipe 1. With the higher end of the pipe 11 is connected by an elbow 12 a four inch pipe 13, which at its other end is connected by an elbow 14 and a reducing flange 15, with a 10 inch receiver pipe 16 which is parallel with and has a length equal to the pipes 1 and 11.

Connected with the receiver pipe 16 is the 4 inch outlet pipe 17 to the gas main, said outlet pipe having a gate 18 in it and the connection having also a safety valve 19. Two other safety valves 20 are placed at the first and at the last stand pipes 3, as shown in Figs. 1 and 2, taking the place of a needle valve at those points.

The lower end of the pipe 1 is fitted with a T 21, having a blind flange 22 at one end, thus closing the pipe. The T 21 has fitted to it a short pipe with a gate 23, followed by an elbow 24, with which connects a 4 inch pipe 25 which leads to the oil tank (not shown). In like manner the lower end of the pipe 11 has connected with it a pipe 26 leading to the oil tank; and so also the receiver pipe 16 has connected with its lower end a pipe 27 leading to the oil tank.

28 is a four inch pipe which leads from the well (not shown). This pipe has a gate at 29 and terminates in a delivery nozzle 30 which is close fitted within the higher end of the pipe 1, by a 2x16 inch flange 31.

This completes the description of the apparatus. Its use is as follows:—The oil and gas issuing from the well, pass through the pipe 28 and are delivered by the nozzle 30 into the separating pipe 1. This pipe represents an attenuated substantially horizontally directed space in which the gas pressure is maintained, and in which the products of the well, by reason of the length of said space, may travel or flow a considerable distance under the well-pressure, and from which the gas and the oil with whatever sand may be present, may be separately and continuously withdrawn. In this space, during the flow through it of the well-product, the gas separates and rises to the upper cross sectional area of the pipe while the oil and sand remain in the lower area. The gas passes off through the stand pipes 3, while the oil and sand pass away through the pipe 25 to the oil tank. During this relatively long flow through the pipe 1, there is time for the separation, and, what is very important, there is time for the condensation from the gas and the return to the oil of that considerable percentage of the lighter hydrocarbons which the gas would otherwise carry away and which would be lost. There is also the advantage of carrying the gas off at a number of points, in that it gives full opportunity for separation of the gas all along the line of flow, and the condensation of the lighter hydrocarbons throughout the course.

Each stand pipe being separately controllable, any number may be thrown into or out of use as, upon observation, the conditions may require. Furthermore, I have found it best to run the gas from the first separating pipe 1 into a second separating pipe 11, and even into a third separating pipe 16, or into as many more separating pipes as may be desirable, in order to insure the more complete separation of the petroleum and the condensation of the lighter hydrocarbons, which liquids are returned to the tank through the pipes 26 and 27. The gas thus freed from its associated materials, passes into the gas mains from the pipe 16, and may be used as required, under all the pressure necessary. Another point to be noticed in this apparatus is the absence of any tendency of the sand which is in the oil cutting out the pipe. This is due to the fact that the well-product is introduced to and is maintained in the pipes under pressure during the process of separation, so that the sand instead of being violently blown against the confining walls and acting with the force of a sand blast, is caused to quietly settle out by gravity.

Having thus described my invention what I claim as new and desire to secure by Letters Patent is—

1. An apparatus for the described purpose comprising a recumbent separating pipe; a supply pipe entering and fitted to one end of said separating pipe by a tight connection and adapted to introduce thereinto the well-product under the well-pressure; a discharge pipe from the other end of said separating pipe, leading from the lower cross sectional area thereof for carrying off to the tank the liquid component of said well-product; and a delivery pipe leading from the upper cross sectional area of said separating pipe for carrying off to the mains the gaseous component of said well-product.

2. An apparatus for the described purpose comprising a recumbent separating pipe; a supply pipe entering and fitted to one end of said separating pipe by a tight connection and adapted to introduce thereinto the well-product under the well-pressure; a discharge pipe from the other end of said separating pipe, leading from the lower cross sectional area thereof for carrying off to the tank the liquid component of said well-product; and a plurality of delivery pipes leading at intervals from the separating pipe throughout its length, said delivery pipes communicating with the upper cross sectional area of said separating pipe, for carrying off to the mains the gaseous component of said well-product.

3. An apparatus for the described purpose comprising a recumbent separating pipe; a supply pipe entering and fitted to one end of said separating pipe by a tight connection and adapted to introduce thereinto the well-product under the well-pressure; a discharge pipe from the other end of said separating pipe, leading from the lower cross-sectional area thereof for carrying off to the tank the liquid component of said well-product; a delivery pipe leading from the upper cross-sectional area of said separating pipe for carrying off therefrom the gaseous component of said well-product; and one or more additional successively communicating recumbent separating pipes to successively receive said gaseous component from the delivery pipe of the first separating pipe, each additional separating pipe having a discharge pipe leading from the lower cross-sectional area thereof for carrying off to the tank the liquid separated from the gas, the final one of said additional separating pipes having an outlet to carry off the gas to the mains.

4. An apparatus for the described purpose comprising a recumbent separating pipe; a supply pipe entering and fitted to one end of said separating pipe by a tight connection and adapted to introduce thereinto the well-product under the well-pressure; a discharge pipe from the other end of said separating pipe, leading from the lower cross-sectional area thereof for carrying off to the tank the liquid component of said well-product; a plurality of delivery pipes leading at intervals from the separating pipe throughout its length, said delivery pipes communicating with the upper cross-sectional area of said separating pipe; and one or more additional successively communicating recumbent separating pipes to successively receive said gaseous component from the plurality of delivery pipes of the first separating pipe, each additional separating pipe having a discharge pipe leading from the lower cross-sectional area thereof for carrying off to the tank the liquid separated from the gas, the final one of said additional separating pipes having an outlet to carry off the gas to the mains.

In testimony whereof I have signed my name to this specification in the presence of two subscribing witnesses.

ERIC A. STARKE.

Witnesses:
WM. F. BOOTH,
D. B. RICHARDS.